UNITED STATES PATENT OFFICE.

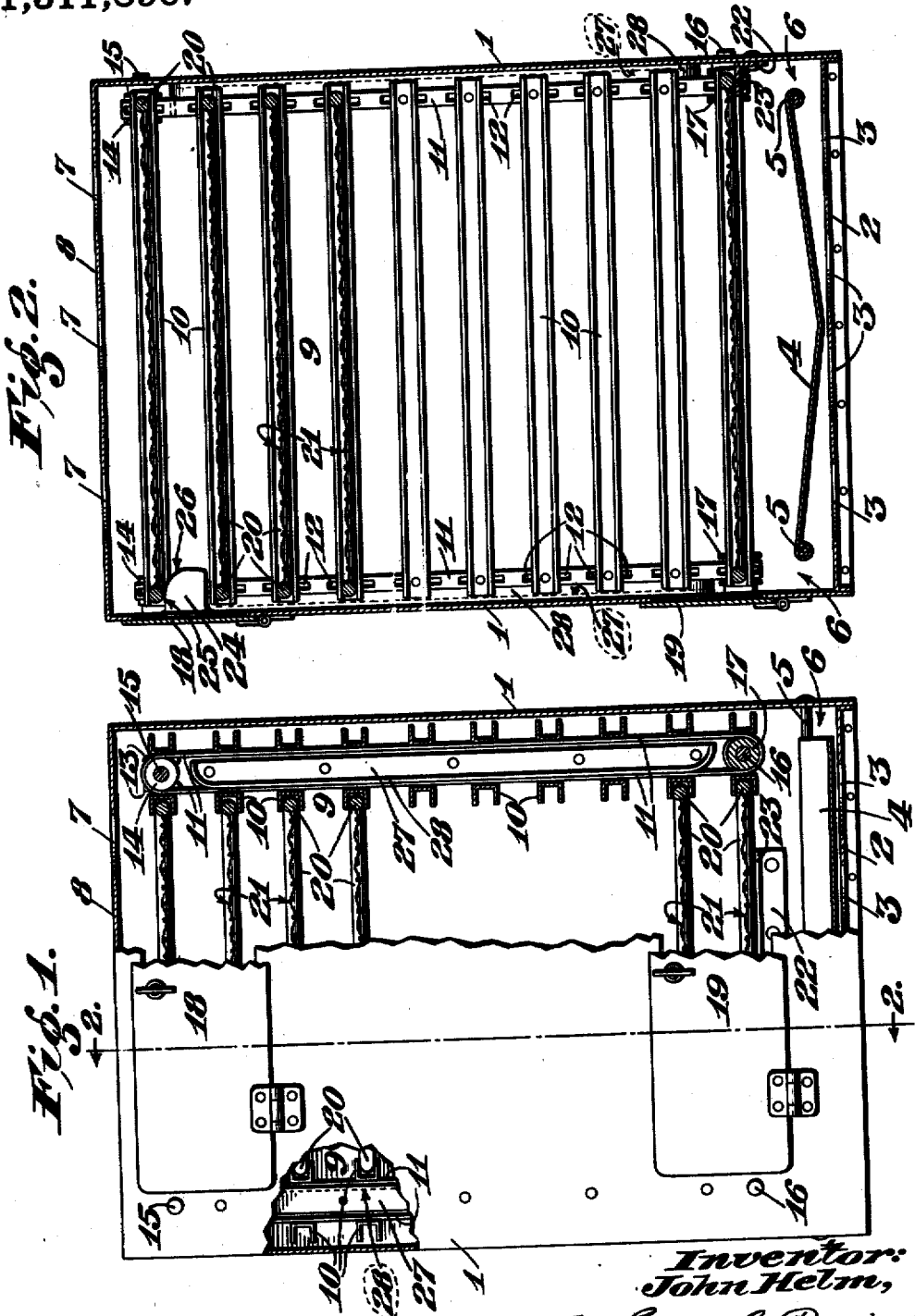

JOHN HELM, OF ST. LOUIS, MISSOURI.

EVAPORATOR.

1,311,890.   Specification of Letters Patent.   Patented Aug. 5, 1919.

Application filed October 6, 1917. Serial No. 195,076.

*To all whom it may concern:*

Be it known that I, JOHN HELM, a citizen of the United States, residing at St. Louis, in the State of Missouri, have invented new and useful Improvements in Evaporators, of which the following is a specification.

This invention relates to evaporators, and more particularly to a domestic utensil or apparatus for use in the evaporation or drying of vegetables and fruits for the conservation of food.

It has for its objects to produce a simple, inexpensive and efficient, portable apparatus which may be set upon an ordinary gas stove over the burner thereof, or heated from any other suitable stove or source at hand in the home, and to attain certain advantages as will more fully appear from the following description.

In the accompanying drawing illustrating a practical adaptation of the invention,—

Figure 1 is a view of the device, partly in front elevation and partly in vertical section; and Fig. 2 is a section on the line 2—2 of Fig. 1.

Referring now to the drawing, the numeral 1 indicates a hollow, rectangular oven shell, preferably of sheet metal. Obviously, this shell may have single walls, as shown, or double or multiple walls with dead-air space or other suitable insulation between, as in the usual and well-known oven constructions.

As shown, this shell 1 has an apertured bottom plate 2, the openings 3 of which may be of any desirable size, shape and number. Above the plate 2 is a deflector or baffle-plate 4 which is supported at two opposite sides on rods 5, which latter are extended through apertures in the side walls of the shell and riveted or otherwise suitably secured in place. This baffle-plate terminates short of the front, back and side walls of the shell 1, so as to provide an opening 6 all around it, whereby to deflect the heated air, when it first enters the shell, toward the walls of the latter.

A suitable outlet is provided at the upper portion of the shell. This is preferably accomplished through apertures 7 in the top wall 8 of the shell, said apertures being somewhat smaller in area than those of the bottom plate 2, whereby the heated air is well distributed throughout the interior of the shell as it passes therethrough.

Mounted in the shell 1, adjacent to the side walls thereof, are two parallel, vertically-disposed endless conveyers 9. Each of these conveyers comprises a pair of suitable sprocket chains or belts, having attached thereto a multiplicity of tray-supports 10.

As shown, the tray-supports comprise channels, and the endless members are flat belts 11, preferably of some suitable inelastic material, such as reinforced asbestos fabric, which possesses the requisite flexibility and will withstand the action of the heat. These belts are provided with apertures 12 for engagement with the teeth or peripheral projections 13 of the sprockets 14, which latter are mounted to rotate on shafts 15, said shafts being supported on the front and back walls of the shell 1 near the top thereof. Near the bottom of the shell 1 are similar shafts 16, having flanged rollers or idlers 17 thereon, over which said belts 11 travel.

In the use of the device, the trays for the stuff to be dried or evaporated, are placed first in the upper portion of the oven and taken finally out at the bottom, doors 18 and 19 being accordingly provided therefor in the front wall, and manipulated, as will be presently pointed out. The trays, of themselves, do not concern the present invention other than the manner in which they coöperate with said doors and the endless conveyers. Hence, they may be of any suitable construction. As illustrated, however, they comprise rectangular marginal frames 20, of round section, and open mesh wire fabric bodies 21, through which the heated air may permeate the stuff thereon.

The loaded trays are made to travel downward intermittently during the time they are in the oven. That is, they are moved downward, step by step, as the bottom tray containing the finished stuff is taken out, and a freshly loaded tray is placed at the top of the column.

To support the column of trays within the oven, a stop projection is provided for engagement with the bottom tray. As shown, this stop comprises an angle-piece 22 secured to the back wall of the oven, so that its horizontal flange 23 is in a plane with its upper face just coinciding with the plane of the under side of the lower-most tray. Hence, the column of trays which are engaged with the channeled tray-supports 10 is held from moving downward while the bottom tray is resting on said stop, and until said bottom tray is withdrawn.

Now, to prevent the column moving downward immediately after the bottom tray is withdrawn from engagement with said stop, another stop is provided for engagement with the upper-most tray. This is accomplished by providing on the inner face of the upper door 18, a lug or lugs 24, preferably two of them, one being located near either end of the door, and adjacent to the corresponding endless conveyer. These lugs, as shown in Fig. 2, have a substantially straight portion 25 at right angles to the door, upon which the tray rests when the door is closed; and from this straight portion, the lug is rounded or beveled off to its end, as at 26, so that, as the door is swung open, the lug remains in sliding engagement with the tray and allowing the latter to move gradually downward, until the then lower-most tray engages the stop 23, thereby preventing the column from dropping suddenly and avoiding the shock which might otherwise occur as the column is arrested by said stop with which the lower-most tray engages.

By keeping a full column of trays in the oven, the intermittent downward movement of the column is entirely automatic, through gravity, aside from the manual manipulation of the doors 18 and 19 and the removal of the bottom tray and the insertion of another tray at the top of the column.

It is, of course, understood that the upper door is kept closed while the bottom tray is being removed. After the bottom tray is taken out the upper door is opened, permitting the column of trays to descend until arrested by the stop 23, as above pointed out. A tray is then placed on the upper-most coöperating pair of vacant tray-supports 10 and the door 18 is closed, thereby bringing the lugs 24 into engaging relation to said tray.

To afford stability for the endless conveyers and to resist end thrust of the trays thereon, elongated vertical shoes are arranged on the front and back walls of the shell 1, adjacent to the endless belts 11. The shoe, as shown, comprises an angle-piece, one of whose flanges 27 is secured to the wall of the shell, while its other flange 28 extends closely alongside of the downwardly traveling portion of the belt.

Obviously, the structure admits of considerable modification without departing from the spirit of the invention as defined by the appended claims. Therefore, it is not limited to that shown in the accompanying drawing, which is designed to illustrate a practical embodiment of the invention in a simple form.

What is claimed is:

1. In a device of the character described, an oven, means for movably supporting a column of trays therein, and means for the releasable engagement of the respective trays in succession, serving as a stop for and permitting an intermittent movement of said column of trays with its support, and controllable by the removal of a tray from one end of the column and the placing of a tray at the opposite end thereof.

2. In a device of the character described, an oven, a pair of oppositely-disposed coöperating endless conveyers having tray-supports thereon for detachable engagement of trays therewith in such relation as to prevent independent movement of the trays in either direction lengthwise of said conveyers, and means for controlling an intermittent movement of a column of trays on said conveyers by the removal of a tray at one end of the column and the placing of a tray at the opposite end of the column.

3. In a device of the character described, an oven, a pair of vertically-arranged, oppositely-disposed endless conveyers having tray-supports thereon for detachable engagement of trays therewith in such relation as to prevent independent movement of the trays in either direction lengthwise of said conveyers, a stop for engaging the lower-most tray of a column on said conveyers to hold said column from moving downward, and releasable means for engaging the upper-most tray of the column, whereby an intermittent downward movement of the column is controlled by the removal of the bottom tray from engagement with its said coöperating stop and the placing of a tray at the top of the column for engagement with its said releasable engaging means.

4. In a device of the character described, an oven, a pair of vertically-arranged, oppositely-disposed endless conveyers having tray-supports thereon for detachable engagement of trays therewith in such relation as to prevent independent movement of the trays in either direction lengthwise of said conveyers, a stop for engaging the lower-most tray of a column on said conveyers to hold said column from moving downward, said oven having a door for access to the lower-most tray of the column and a door likewise for access to the upper-most tray of the column, said second-mentioned door having means thereon for engagement with the upper-most tray, whereby an intermittent downward movement of the column is controlled by the removal of the bottom tray from engagement with its said coöperating stop and the placing of a tray at the top of the column for engagement with the said engaging means on said second-mentioned door.

5. In a device of the character described, an oven, a pair of coöperatively-opposed, vertically-disposed endless conveyers, said conveyers having horizontally-disposed channel-shape tray-supporting members, a stop secured to the back wall of said oven in a plane to engage the lower-most tray of a column thereof on said conveyers, a door in the front wall of said oven for access to said lower-most tray, and a door for access to the upper-most tray-supports of the conveyers, said second-mentioned door having a projection thereon for engagement with a tray on said upper-most tray-supports.

6. In a device of the character described, an oven, said oven having an apertured bottom, a baffle-plate above said bottom, and a perforated top, means for movably supporting a column of trays therein, and means for permitting an intermittent movement of said column of trays with its support, controllable by the removal of a tray from one end of the column and the placing of a tray at the opposite end thereof.

7. In a device of the character described, an oven, said oven having an apertured bottom, a baffle-plate above said bottom, and an apertured top, said baffle-plate terminating short of the walls of said oven, a pair of endless conveyers located adjacent to the side walls of the oven in opposed coöperative, parallel, vertical relation, said conveyers having tray-supports thereon for detachable engagement of trays therewith in such relation as to prevent independent movement of the trays in either direction lengthwise of said conveyers, a stop for engaging the lower-most tray of a column on said conveyers to hold said column from moving downward, and releasable means for engaging the upper-most tray of the column, whereby an intermittent downward movement of the column is controlled by the removal of the bottom tray from engagement with its said coöperating stop and the placing of a tray at the top of the column for engagement with its said releasable engaging means, and a door in said oven for access to said upper-most and lower-most trays, respectively.

8. In a device of the character described, an oven, a pair of coöperatively-opposed, vertically-disposed endless conveyers, said conveyers having tray-supports thereon for detachable engagement of trays therewith in such relation as to prevent independent movement of the trays in either direction lengthwise of said conveyers, a stop for engaging the lower-most tray of a column on said conveyers to hold said column from moving downward, a door in said oven for access to the lower-most tray of the column, and a door for access to the upper-most tray of the column, said second-mentioned door having an extension for engagement with said upper-most tray to hold the column of trays from moving downward when the door is closed, said extension being formed for slidable engagement with the tray so as to permit a gradual descent of the column as the extension moves out of engagement with the tray upon opening the door after the lower-most tray is withdrawn from engagement with its said coöperating stop.

9. In a device of the character described, an oven, means for movably supporting a column of trays therein, said means comprising a pair of oppositely-disposed coöperating endless conveyers having tray-supports thereon for detachable engagement of the respective trays therewith in such relation as to prevent independent movement of the trays in either direction lengthwise of the conveyers, and means for supporting said column of trays and permitting an intermittent downward movement of the column, said means comprising a stop for the releasable engagement of the respective trays in the column in succession.

In testimony whereof, I have hereunto set my hand.

JOHN HELM.

Copies of this patent may be obtained for five cents each, by addressing the "Commissioner of Patents, Washington, D. C."